(12) United States Patent
Salkintzis

(10) Patent No.: US 11,683,313 B2
(45) Date of Patent: Jun. 20, 2023

(54) DETERMINING POLICY RULES IN A MOBILE NETWORK USING SUBSCRIPTION DATA IN AN APPLICATION SERVER

(71) Applicants: Lenovo (Singapore) PTE LTD, New Tech Park (SG); Apostolis Salkintzis, Athens (GR)

(72) Inventor: Apostolis Salkintzis, Athens (GR)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 288 days.

(21) Appl. No.: 16/650,704

(22) PCT Filed: Sep. 25, 2017

(86) PCT No.: PCT/EP2017/074162
§ 371 (c)(1),
(2) Date: Mar. 25, 2020

(87) PCT Pub. No.: WO2019/057305
PCT Pub. Date: Mar. 28, 2019

(65) Prior Publication Data
US 2020/0280562 A1    Sep. 3, 2020

(51) Int. Cl.
*H04L 9/40*          (2022.01)
*H04L 65/1063*       (2022.01)
(Continued)

(52) U.S. Cl.
CPC .......... *H04L 63/101* (2013.01); *G06F 9/4451* (2013.01); *H04L 63/0254* (2013.01);
(Continued)

(58) Field of Classification Search
CPC ... H04L 63/101; H04L 67/53; H04L 63/0254; H04L 65/1063; H04L 67/306;
(Continued)

(56) References Cited

U.S. PATENT DOCUMENTS 9,667,805 B2 * 5/2017 Tapia ................ H04M 15/8016
10,164,934 B1 * 12/2018 Bittfield .............. H04L 61/1511
(Continued)

FOREIGN PATENT DOCUMENTS

EP    1576839 A2    4/2004
WO    2004029854 A2    4/2004

OTHER PUBLICATIONS

PCT, "International Search Report", dated May 12, 2017, pp. 1-4.
(Continued)

*Primary Examiner* — Mandish K Randhawa
(74) *Attorney, Agent, or Firm* — Kunzler Bean & Adamson

(57) ABSTRACT

Apparatuses, methods, and systems are disclosed for creating service rules based on user information retrieved from an application server. One apparatus includes a processor and a transceiver that communicates with one or more network functions in a mobile communication network. The transceiver receives a request to provide service rules for a user in response to a request received by the mobile communication network from the user to establish a data connection. The processor identifies one or more service contexts associated with the user and retrieves user information by using each of the identified one or more service contexts. A service context holds information for accessing user information in an application server. The processor creates one or more
(Continued)

service rules by using the user information, wherein the mobile communication network applies the one or more service rules to configure the data connection.

20 Claims, 10 Drawing Sheets

(51) Int. Cl.
*H04L 67/306* (2022.01)
*G06F 9/445* (2018.01)
*H04L 67/53* (2022.01)
*H04W 8/20* (2009.01)
*H04W 8/18* (2009.01)

(52) U.S. Cl.
CPC ........ *H04L 65/1063* (2013.01); *H04L 67/306* (2013.01); *H04L 67/53* (2022.05); *H04W 8/18* (2013.01); *H04W 8/20* (2013.01)

(58) Field of Classification Search
CPC ... H04L 65/612; H04L 65/80; H04L 65/1069; G06F 9/4451; H04W 8/18; H04W 8/20
See application file for complete search history.

(56) References Cited

U.S. PATENT DOCUMENTS

| | | | |
|---|---|---|---|
| 2004/0116117 A1* | 6/2004 | Ahvonen | H04W 12/068 455/452.2 |
| 2011/0208853 A1 | 8/2011 | Castro-Castro et al. | |
| 2011/0231920 A1* | 9/2011 | Asano | H04L 63/0815 726/8 |
| 2018/0007099 A1* | 1/2018 | Ein-Gil | H04L 67/16 |
| 2018/0227743 A1* | 8/2018 | Faccin | H04W 8/08 |

OTHER PUBLICATIONS

PCT, "Written Opinion of the International Searching Authority", dated May 12, 2017, pp. 1-8.
R. Chenkie, "Angular Authentication: Using the Http Client and Http Interceptors", Medium.com, Jul. 18, 2017, pp. 1-8.
Nokia et al., "23.501 § 6.3.x: PCF selection", SA WG2 Meeting #S2-121 S2-173272, May 29-Jun. 2, 2017, pp. 1-2.
Wilde, "Wilde's WWW: Technical Foundations of the World Wide Web", Nov. 16, 1998, p. 1.

* cited by examiner

DETERMINING POLICY RULES IN A MOBILE NETWORK USING SUBSCRIPTION DATA IN AN APPLICATION SERVER

FIELD

The subject matter disclosed herein relates generally to wireless communications and more particularly relates to creating service rules based on user information retrieved from an application server.

BACKGROUND

The following abbreviations and acronyms are herewith defined, at least some of which are referred to within the following description.

Third Generation Partnership Project ("3GPP"), Access and Mobility Management Function ("AMF"), Carrier Aggregation ("CA"), Clear Channel Assessment ("CCA"), Control Channel Element ("CCE"), Channel State Information ("CSI"), Common Search Space ("CSS"), Downlink Control Information ("DCI"), Downlink ("DL"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Hybrid Automatic Repeat Request ("HARQ"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MCS"), Machine Type Communication ("MTC"), Massive MTC ("mMTC"), Multiple Input Multiple Output ("MIMO"), Multipath TCP ("MPTCP"), Multi User Shared Access ("MUSA"), Narrowband ("NB"), Network Function ("NF"), Next Generation Node B ("gNB"), Policy Control & Charging ("PCC"), Policy Control Function ("PCF"), Quality of Service ("QoS"), Quadrature Phase Shift Keying ("QPSK"), Radio Resource Control ("RRC"), Receive ("RX"), Switching/Splitting Function ("SSF"), Scheduling Request ("SR"), Session Management Function ("SMF"), System Information Block ("SIB"), Transport Block ("TB"), Transport Block Size ("TBS"), Transmission Control Protocol ("TCP"), Time-Division Duplex ("TDD"), Time Division Multiplex ("TDM"), Transmission and Reception Point ("TRP"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Ultra-reliability and Low-latency Communications ("URLLC"), and Worldwide Interoperability for Microwave Access ("WiMAX").

The 5G network architecture defined by 3GPP contains a Policy Control Function ("PCF") which determines the policy rules that should be applied to every data connection established by a mobile device. These policy rules are determined when a new data connection is established; however, after the establishment of the data connection, there may be a need to update or modify the policy rules. Typically, policy rules are applied in order to enforce certain level of QoS or certain type of charging for the data flows transferred in the data connection. If, at a later time, the subscription data of the mobile device changes, the policy rule may be revoked or a different policy rule could be added.

In many scenarios, the policy rules are static, i.e., determined based on subscription data and/or pre-configured information manually created by the operator. In other scenarios, however, the policy rules are dynamic, i.e., determined based on the service requirements of the created data flows. For example, when a mobile user initiates a voice call over IMS, a new policy rule can be created which determines the QoS for the data flows associated with this voice call. This QoS will be used to reserve network resources so that the data flows can be transferred with adequate bandwidth and priority and fulfill their QoS requirements. When the voice call is terminated, this policy rule is revoked and the associated network resources are released.

BRIEF SUMMARY

Methods for creating service rules based on user information retrieved from an application server are disclosed. Apparatuses and systems also perform the functions of the methods. In some embodiments, a method for creating service rules based on user information retrieved from an application server includes receiving a request to provide service rules for a mobile communication network user (also referred to as a "mobile user") in response to a request received by the mobile communication network from the user to establish a data connection to a data network and identifying one or more service contexts associated with the user. Here, each service context contains information for accessing user information in an application server. The method includes retrieving user information by using each of the identified service contexts and creating one or more service rules by using the retrieved user information. The method further includes applying the one or more service rules to configure the data connection requested by the user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
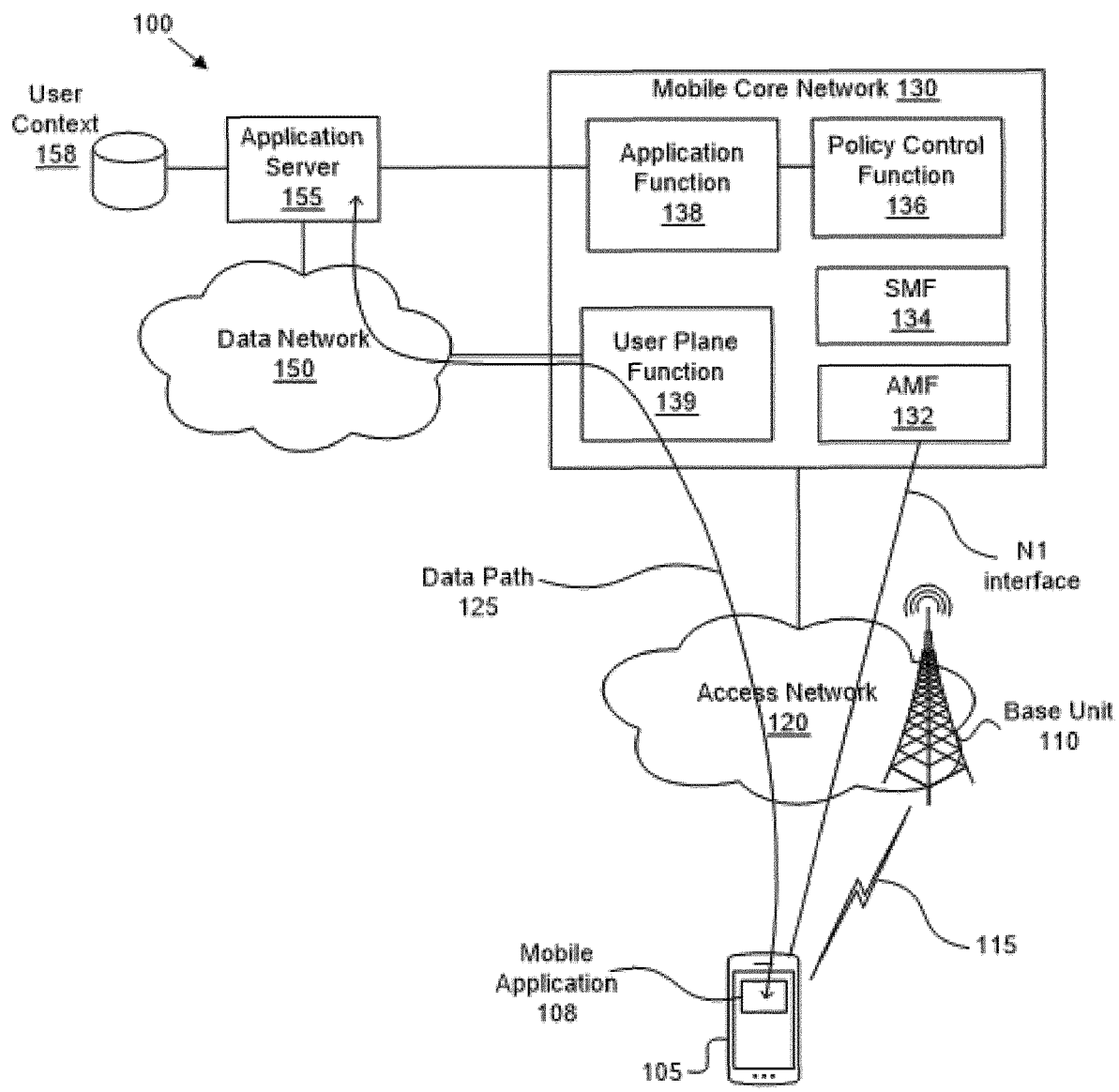
FIG. 1 is a schematic block diagram illustrating one embodiment of a wireless communication system for creating service rules based on user information retrieved from an application server.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

FIG. 1 depicts a wireless communication system 100 for creating service rules based on user information retrieved from an application server, according to embodiments of the disclosure. In one embodiment, the wireless communication system 100 includes at least one remote unit 105, an access network 120 containing at least one base unit 110, wireless communication links 115, and a mobile core network 130. Even though a specific number of remote units 105, access networks 120, base units 110, wireless communication links 115, and mobile core networks 130 are depicted in FIG. 1, one of skill in the art will recognize that any number of remote units 105, access networks 120, base units 110, wireless communication links 115, and mobile core networks 130 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

In some embodiments, the remote units 105 communicate with an application server 155 via a data path 125 that passes through the mobile core network 130 and a data network 150. For example, a remote unit 105 may establish a PDU connection (or a data connection) to the data network 150 via the mobile core network 130 and the access network 120. The mobile core network 130 then relays traffic between the remote unit 105 and the application server 155 using the PDU connection to the data network 150.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 130 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 130 is a 5G core ("5GC") or the evolved packet core ("EPC"), which may be coupled to a data network 150, like the Internet and private data networks, among other data networks. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes multiple control plane functions including, but not limited to, an Access and Mobility Management Function ("AMF") 132, a Session Management Function ("SMF") 134, a Policy Control Function ("PCF") 136, and an Application Function ("AF") 138. Additionally, the mobile core network 130 includes a user plane function ("UPF") 139. Although specific numbers and types of network functions are depicted in FIG. 1, one of skill in the art will recognize that any number and type of network functions may be included in the mobile core network 130.

To create service rules based on user information retrieved from an application server, the Application Function ("AF") 138 provides special functionality for interfaces with the PCF 136 and with the Application Server ("AS") 155. In some scenarios, the Application Server 155 is external to the mobile core network and it is operated by a third-party service provider, such as Netflix™, Facebook™, Spotify™, YouTube™, or the like. In other scenarios, the Application Server 155 can be internal to the mobile core network 130 and be operated by the mobile network operator in order to provide its own service. For example, where the mobile core network 130 is operated by Vodafone™, the AS 155 may could be the Vodafone™'s application server that provides music streaming. Here, the Application Server 155 provides access to an online application that can be accessed by all users that have the appropriate credentials.

The User Context 158 contains user specific information associated with the application supported by the Application Server 155. For example, in case of a Netflix™ application server 155, the User Context 158 may contain (a) subscription type information, for example indicating if the user has a standard (or a premium) Netflix™ subscription and/or if the user can access high-definition content, (b) user preferences indicating what type of movies the user prefers, (c) usage information indicating how frequently the user streams movies, etc. In case of a Facebook™ application server 155, the User Context 158 may also contain the social information for the user: the user's social profile, the 'likes' he/she has made, the 'postings' he/she has made, etc.

The AF 138 retrieves User Context 158 (e.g., user information) from the AS 155 and creates (based on the User Context 158) one or more Service Rules, each one indicating how the traffic associated with a service provided by the AS 155 should be handled in the mobile network. The Service Rules are then mapped to PCC policy rules which are then applied to a data connection (e.g., a PDU session) established between the remote unit 105 and the data network 150. In various embodiments, the Service Rules may indicate a QoS level, a charging rate, and/or a preferred access type for traffic associated with a service. In some embodiments, the data connection may be a multi-access PDU session with one data path (access leg) established via a 5G cellular base unit 110 and another data path established via a WLAN (Wi-Fi™) base unit 110. Here, the Service Rule may indicate which data path traffic associated with the service should use.

Note that the Service Rules are high-level rules, each one indicating how the traffic associated with a service should be handled. In contrast, the PCC rules are low-level (more detailed) rules which are applied in the mobile communication network. As an example, a Service Rule may indicate "apply premium QoS to Netflix™ traffic" and the corresponding PCC rule may indicate "apply QoS=5 to all data flows to IP address a.b.c.d", where the IP address "a.b.c.d" corresponds to an application server associated with the Netflix™ service. As another example, a Service Rule for multi-access PDU session may indicate "traffic to *.netflix.com is to be sent over the least congested access" and the corresponding PCC rule may indicate "use Access Leg 2 for all data flows to IP address a.b.c.d". In various embodiments, the PCF 136 takes the Service Rules and converts them into corresponding PCC rules. In other embodiments, another network function in the mobile core network 130 converts the Service Rules into corresponding PCC rules.

Figure 2:
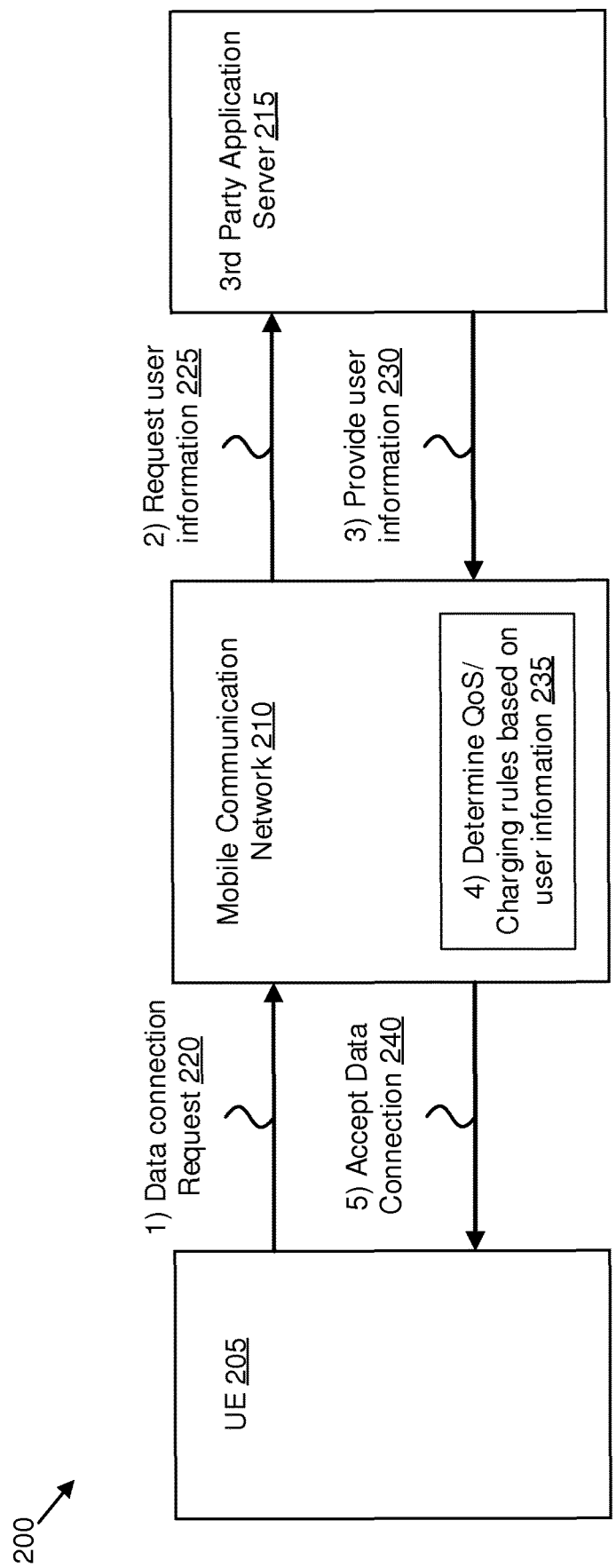
FIG. 2 is a block diagram illustrating one embodiment of a network architecture for creating service rules based on user information retrieved from an application server.

FIG. 2 depicts a network architecture 200 used for creating service rules based on user information retrieved from an application server, according to embodiments of the disclosure. The network architecture 200 may be a simplified embodiment of the wireless communication system 100. As depicted, the network architecture 200 includes a UE 205 that communicates with mobile communication network 210 and a third-party application server 215. Here, the UE 205 may be one embodiment of the remote unit 105, the mobile communication network 210 may be an embodiment of the mobile core network 130 and access network 120, and the third-party application server 215 may be one embodiment of the application server 155.

As depicted, the UE 205 first requests 220 a data connection with the mobile communication network 210. In response, the mobile communication network 210 requests 225 user information from the third-party application server 215 (e.g., an external service provider). The third-party application server 215 provides 230 the requested user information to the mobile communication network 210. In certain embodiments, the mobile communication network 210 accesses restricted data in the user's account on the third-party application server 215 due to the user (UE 205) previously authorizing the mobile communication network 210 to access his/her user's account. In one embodiment, the UE 205 and third-party application server 215 perform conventional authorization (e.g., OAuth authentication procedure), where the third-party application server 215 provides a user-specific access token to the mobile communication network 210, which authorizes the mobile communication network 210 to access restricted data in the user's account.

In response to receiving the user information, the mobile communication network 210 determines 235 QoS, charging, and/or access type policies (e.g., PCC rules) based on the user information. For example, the user information may indicate that the UE 205 qualifies for improved QoS levels and/or reduced charging rates. The mobile communication network 210 then responds to the UE 205 by accepting 240 the data connection request and the determined QoS and/or charging policies are applied to the established data connection. The QoS, charging, and/or access type policies allow for enhanced connectivity to services offered by the third-party application server 215 and/or improved user experience via the data connection.

Figure 3:
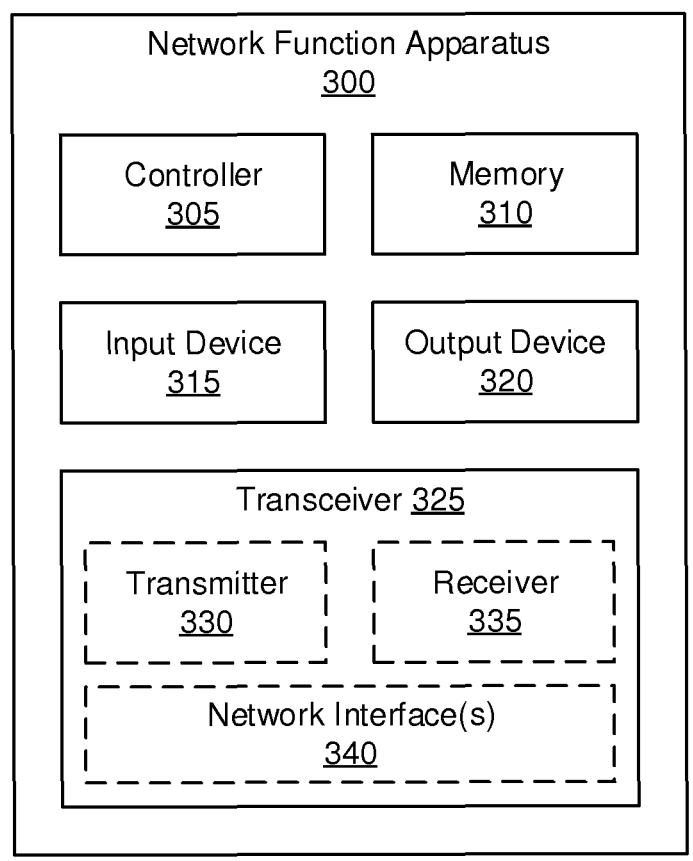
FIG. 3 is a schematic block diagram illustrating one embodiment of a network function apparatus for creating service rules based on user information retrieved from an application server.

FIG. 3 depicts one embodiment of a network function apparatus 300 that may be used for creating service rules based on user information retrieved from an application server, according to embodiments of the disclosure. The network function apparatus 300 may be one embodiment of the SMF 146. Furthermore, the network function apparatus 300 may include a processor 305, a memory 310, an input device 315, a display 320, and a transceiver 325. In some embodiments, the input device 315 and the display 320 are combined into a single device, such as a touch screen. In certain embodiments, the network function apparatus 300 may not include any input device 315 and/or display 320.

As depicted, the transceiver 325 includes at least one transmitter 330 and at least one receiver 335. Additionally, the transceiver 325 may support at least one network interface 340. Here, the network interface 340 facilitates communication with one or more a network function such as the PCF 148. Additionally, the at least one network interface 340 may include an interface used for communications with an external application server, such as the application server 155.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and the transceiver 325.

In some embodiments, the transceiver 325 receives a request to provide service rules for a mobile user in response to a request received by the mobile communication network from the mobile user to establish a data connection to a data network. In response to the data request for service rules, the processor 305 identifies one or more service contexts associated with the mobile user. Here, each service context holds information for accessing user information in an application server. In certain embodiments, a service context may be associated with both the mobile user and with a particular data network. In one embodiment, the service contexts are stored in the memory 310. In another embodiment, the service contexts are stored in a networked storage device (e.g., accessed using the transceiver 325).

Moreover, the processor 305 retrieves user information (e.g., from the application servers identified in the service contexts) by using each of the identified one or more service contexts and creates one or more service rules by using the retrieved user information. In such embodiments, the mobile network applies the one or more service rules to configure the data connection requested by the mobile user. In one embodiment, the data connection is established after creation of the service rules. In another embodiment, the data connection is established prior to creation of the service rules and the established data connection is then modified once the service rules are created.

As used herein, the term "mobile user" refers to a user of a mobile communication network. The "mobile user" may use a fixed terminal, mobile terminal, wearable terminal, or the like to access the mobile communication network. In certain embodiments, the "mobile user" accesses the mobile communication network while in motion. In other embodiments, the "mobile user" accesses the mobile communication network while stationary.

In certain embodiments, receiving the request to provide service rules for the mobile user includes the transceiver 325 receiving a service rule request from a policy control function in the mobile communication network, such as the PCF 136. Here, the service rule request may include a subscriber permanent identity ("SUPI") of the mobile user. In certain embodiments, the service rule request may also include a data network name ("DNN").

In some embodiments, each service context includes 1) a network address of the application server, 2) a user identifier in the application server associated with the mobile user, and 3) an access token corresponding to the mobile user identifier for accessing user information stored on the application server. Moreover, in certain embodiments, the retrieved user information indicates one or more of: a subscription type, user preferences, usage activity for a service provided by the application server, and social network activity of the mobile user.

In certain embodiments, the processor 305 further creates a service context by requesting the mobile user to authorize the access to information associated with the mobile user that is stored in an application server. In such embodiments, the processor requests the mobile user to authorize the access to information associated with the mobile user by intercepting data traffic of the mobile user and responding to the intercepted traffic with a request to authorize the access to information associated with the mobile user that is stored in an application server. In one embodiment, the network function apparatus 300 operates as an HTTP proxy for the mobile user.

In some embodiments, the application server is operated by a third-party service provider and wherein the retrieved user information indicates a subscription type that the mobile user has with the third-party service provider. In such embodiments, each of the one or more service rules is associated with a service provided by the application server (e.g., with a Netflix™ streaming service provided by the Netflix™ application server). In one embodiment, the service rule associated with a particular service provided by the application server indicates a QoS level to be applied to traffic associated with the service. Here, the service rule associated with a particular service provided by the application server indicates a QoS level to be applied to traffic associated with this service. In another embodiment, the service rule associated with a particular service provided by the application server indicates a charging rate to be applied to traffic associated with this service. When the subscription type that the mobile user has with the third-party service provider (or user preferences, usage activity for a service provided by the application server, or social network activity) meets a predetermined requirement, the quality of service may be an improved quality of service and/or the charging rate may be a reduced charging rate.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to creating service rules based on user information retrieved from an application server, for example storing policy rules, service rules, service contexts, and the like. In certain embodiments, the memory 310 also stores program code and related data, such as an operating system or other controller algorithms operating on the network function apparatus 300 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

The transceiver 325 communicates with one or more network functions of a mobile communication network. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335. As discussed above, the transceiver 325 may support one or more the network interface 340 for communicating with the base unit 110.

Figure 4A:
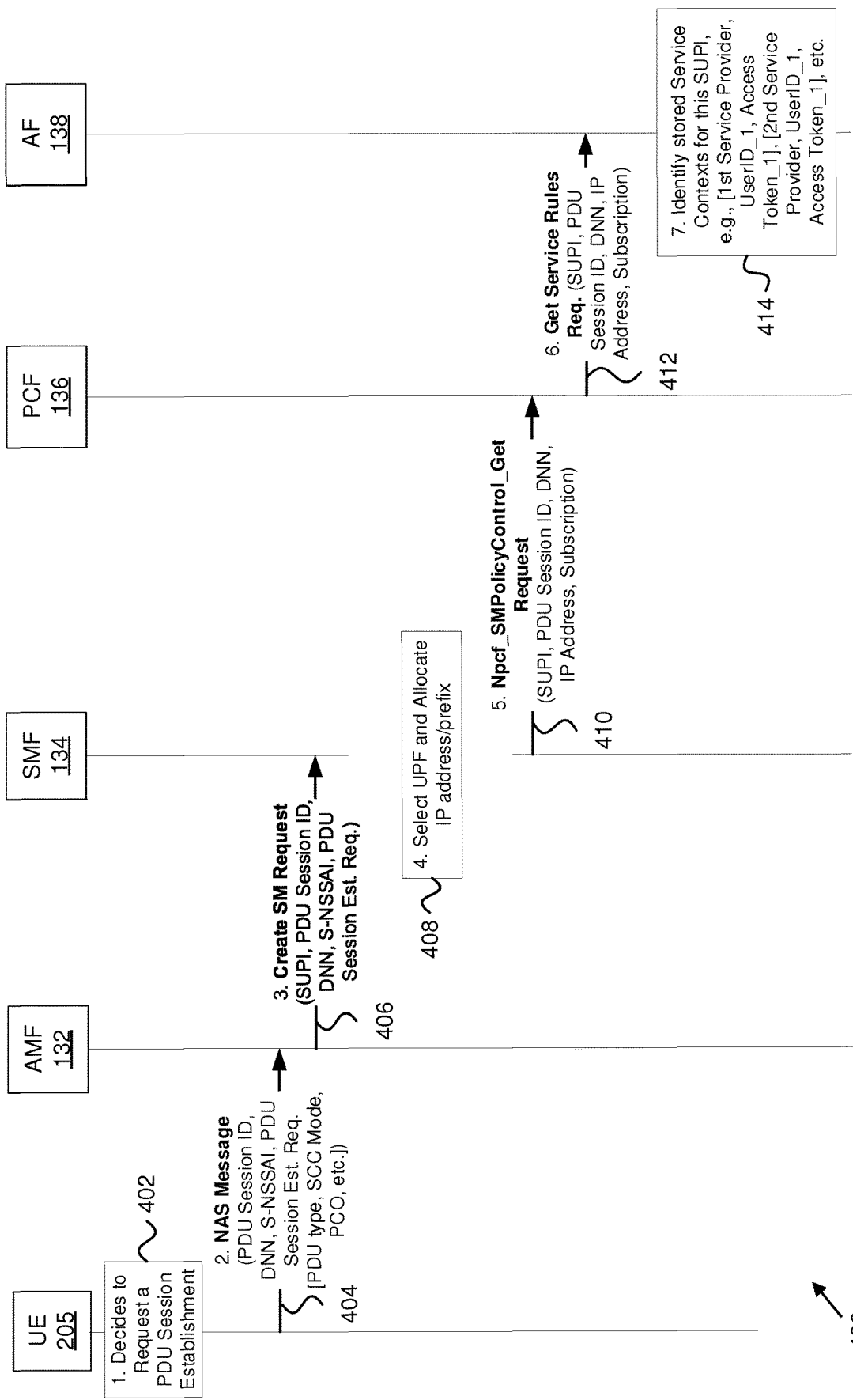
FIG. 4A is a block diagram illustrating one embodiment of a network procedure for creating service rules for a data connection based on user information retrieved from an application server.
Figure 4B:
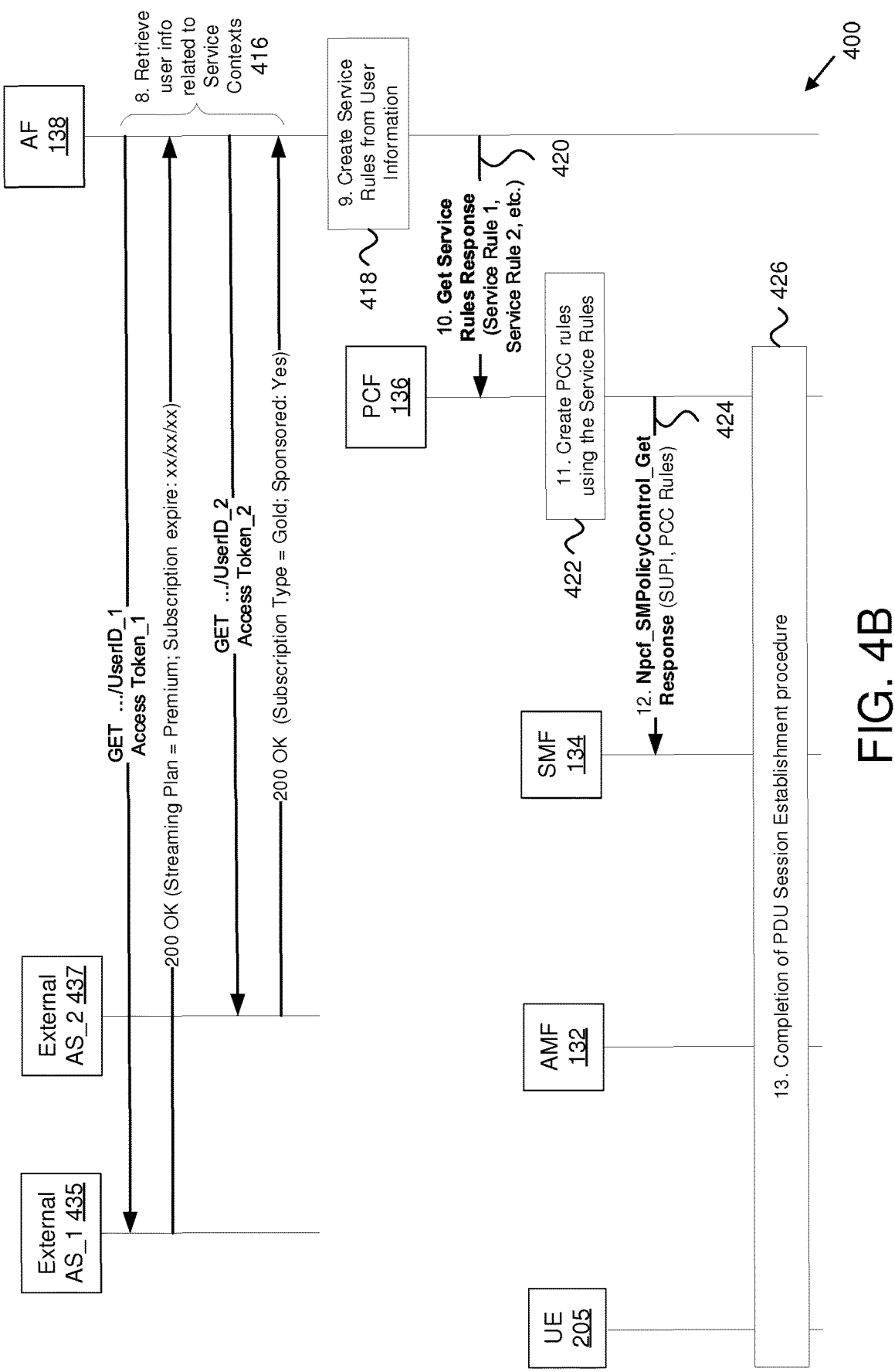
FIG. 4B is a continuation of the network procedure of FIG. 4A.

FIGS. 4A-4B depicts a network procedure 400 for creating service rules for a data connection based on user information retrieved from an application server, according to embodiments of the disclosure. The network procedure involves the UE 205, the AMF 132, the SMF 134, the PCF 136, and the AF 138. The AMF 132, the SMF 134, the PCF 136, and the AF 138 are all network functions in a mobile communication network, such as the mobile communication network 210.

At FIG. 4A, the network procedure 400 begins as the UE 205 decides to establish a data connection (see block 402). Accordingly, the UE 205 sends a NAS message to the AMF 132 (see messaging 404). Here, the NAS message includes a "PDU Session Establishment Request." The NAS message also includes a PDU Session ID created by the UE 205 and a Data Network Name ("DNN") which indicates the external DN with which the UE wants to establish the data connection (e.g., the data network 150). The NAS message may also include a S-NSSAI for selecting a particular network slice in the mobile communication network. Parameters included in the PDU Session Establishment Request message may include a PDU type, a session and service continuity ("SSC") mode, a protocol configuration option ("PCO"), and the like.

The AMF 132, in turn, sends a session management ("SM") message to the SMF 134 (see messaging 406). The SM message indicates to SMF 134 that a new PDU session is requested. In some embodiments, the SM message is a Nsmf_PDU_Session_CreateSMRequest message that invokes a corresponding service supported by the SMF 134. Here, parameters included in the SM message include a Subscriber Permanent Identity ("SUPI") of the UE 205, the PDU Session ID, the requested DNN and S-NSSAI, as well as the PDU Session Establishment Request.

In response to receiving the SM message, the SMF 134 selects a UPF (or multiple UPFs) to support the user plane for the requested PDU session (see block 408). Additionally, the SMF 134 allocates an IPv4 address and/or an IPv6 prefix for the PDU session. The SMF 134 also requests policies for this PDU session from the PCF 136 (see messaging 410).

In some embodiments, the SMF 134 requests policies for the PDU session by invoking the Npcf_SMPolicyControl_Get service supported by PCF 136. Here, the SMF 134 provides the PCF 136 with the SUPI of the user, the PDU Session ID, DNN, and the IP Address/prefix allocated for this PDU session. In certain embodiments, the policy request includes a Subscription element indicating whether the SMF 134 wants to receive notifications from the PCF 136 when the policies for the PDU session should be updated.

In response to receiving the policy request from the SMF 134, the PCF 136 requests Service Rules from the AF 138 (see messaging 412). Each Service Rule is associated with an external service with which the user has subscription. In certain embodiments, a Service Rule may additionally be associated with a specific DNN. For example, one Service Rule may be associated with Netflix™, Hulu™, or other video streaming service and may indicate if premium or standard QoS should be applied when the user attempts to access the video streaming service.

The AF 138 identifies one or more Service Contexts for the received SUPI, if any (see block 414). Each Service Context includes information that can be used by AF 138 for accessing user information from a specific application server. For example, the Service Context for Netflix™ may include the address of the Netflix™ application server and information usable to access the application server, such as a UserID and an access token (e.g., password). In certain embodiments, a Service Context is associated with both a user (identified by the SUPI) with a specific DNN. The AF 138 uses the information in the Service Context to access the Netflix™ application server and retrieve information about this user, referred to as "user information." Note that the one or more Service Contexts identified by the AF 138 have been previously created and stored in the AF 138. Embodiments of creating Service Contexts are discussed below with reference to FIGS. 6A-6B.

Continuing at FIG. 4B, the AF 138 uses each of the identified Service Context to request and retrieve information about the user from an external application server (see messaging 416). Here, the AF 138 may use HTTP requests, such as the GET request, to request user information from each application server listed in an identified Service Context. As illustrated, an AS may respond using HTTP 200 OK responses. Here, the AF 138 is depicted contacting a first external AS 435 and a second external AS 437 based on the identified Service Contexts. Each of the first and second external application servers 435, 437 may be an embodiment of the AS 155, discussed above.

As one example, by using a first Service Context associated with the video streaming service, the AF 138 may retrieve information from a first external AS 435 associated with the video streaming service. Here, the user information may indicate that the user has a premium subscription. The user information may also indicate a validity period for the subscription (here, expressed as a subscription expiration date). In certain embodiments, the AF 138 rechecks the user information each time the UE 205 requests a new PDU session, even when previously retrieved user information (e.g., subscription type information) has not expired. As another example, by using a second Service Context associated with a music streaming service, the AF 138 may retrieve information from a second external AS 437 (associated with the music streaming service) indicating that the user has a gold subscription. Here, the user information may also indicate that user connectivity to the music streaming service is sponsored (e.g., offered free of charge for the user).

Having retrieved the user information, the AF 138 creates one or more Service Rules based on the user information (see block 418). Each Service Rule describes what type of QoS and/or charging should be applied to the data flows (e.g., traffic) associated with a certain service. The Service Rules are based on both the user information retrieved from the one or more external AS and on a pre-configured policy in the AF 138. The pre-configured policy allows the AF 138 to determine if the user qualifies for, e.g., improved QoS and/or reduced charging rate due to their association with certain third parties.

One example of a pre-configured policy in the AF 138 is a rule indicating that premium subscribers of a particular video streaming service (e.g., Netflix™) are to receive premium QoS when accessing the particular video streaming service via the mobile communication network. Based on this pre-configured policy, the AF 138 then creates a Service Rule for a Netflix™ premium subscriber indicating that "traffic to *.netflix.com is to have premium QoS". Another example of a pre-configured policy in the AF 138 is a rule indicating that a social network account holder is to receive premium QoS for 6 hours if he/she promotes the operator of the mobile communication network on their social network account. A third example of a pre-configured policy in the AF 138 is a rule indicating that a gold-level subscriber of a particular music streaming service (e.g., Spotify™) is not to be charged when accessing those music streaming services. Based on this pre-configured policy, the AF 138 then creates a Service Rule for a Spotify™ premium subscriber indicating that "traffic to *.spotify.com is not be charged".

Upon creating the Service Rules from the retrieved user information, the AF 138 responds to the request of PCF (e.g., in step 412 above) and provides the created Service Rules (see messaging 420). The PCF 136 then converts the received Service Rules into Policy Control & Charging ("PCC") rules, which are suitable to be applied in the mobile communication network (see block 422). For example, assuming the netflix.com domain corresponds to the network address 122.87/16 and the premium QoS corresponds to QoS Flow Identity (QFI) with value 5, then the Service Rule "traffic to *.netflix.com is to have premium QoS" will be converted to a PCC rule "traffic to network 122.87/16 is to have QFI=5".

Next, the PCF 136 provides to SMF 134 all PCC rules that should be applied to the PDU session (see messaging 424). While the PCF 136 sends the PCC rules created from Service Rules as described above, the PCF 136 may also send other PCC rules that may be pre-configured in the PCF 136 or may be derived by PCF 136 by using other means. After that, the PDU session is established by using the predefined signaling and the provided PCC rules are applied to affect the QoS, the charging, and/or the access leg (data path) of the data flows transferred via the PDU session (see block 426).

Figure 5A:
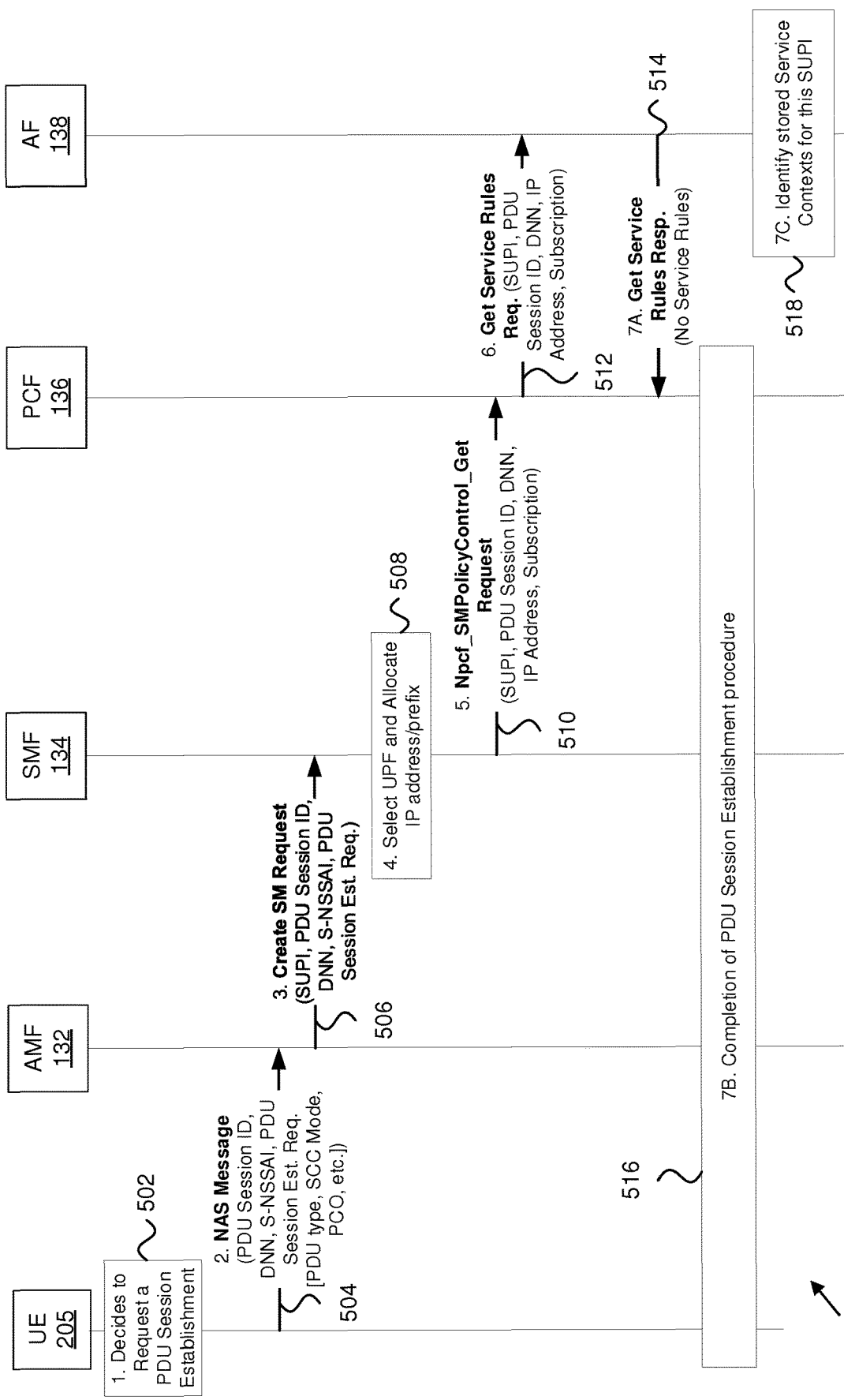
FIG. 5A is a block diagram illustrating another embodiment of a network procedure for creating service rules for a data connection based on user information retrieved from an application server.
Figure 5B:
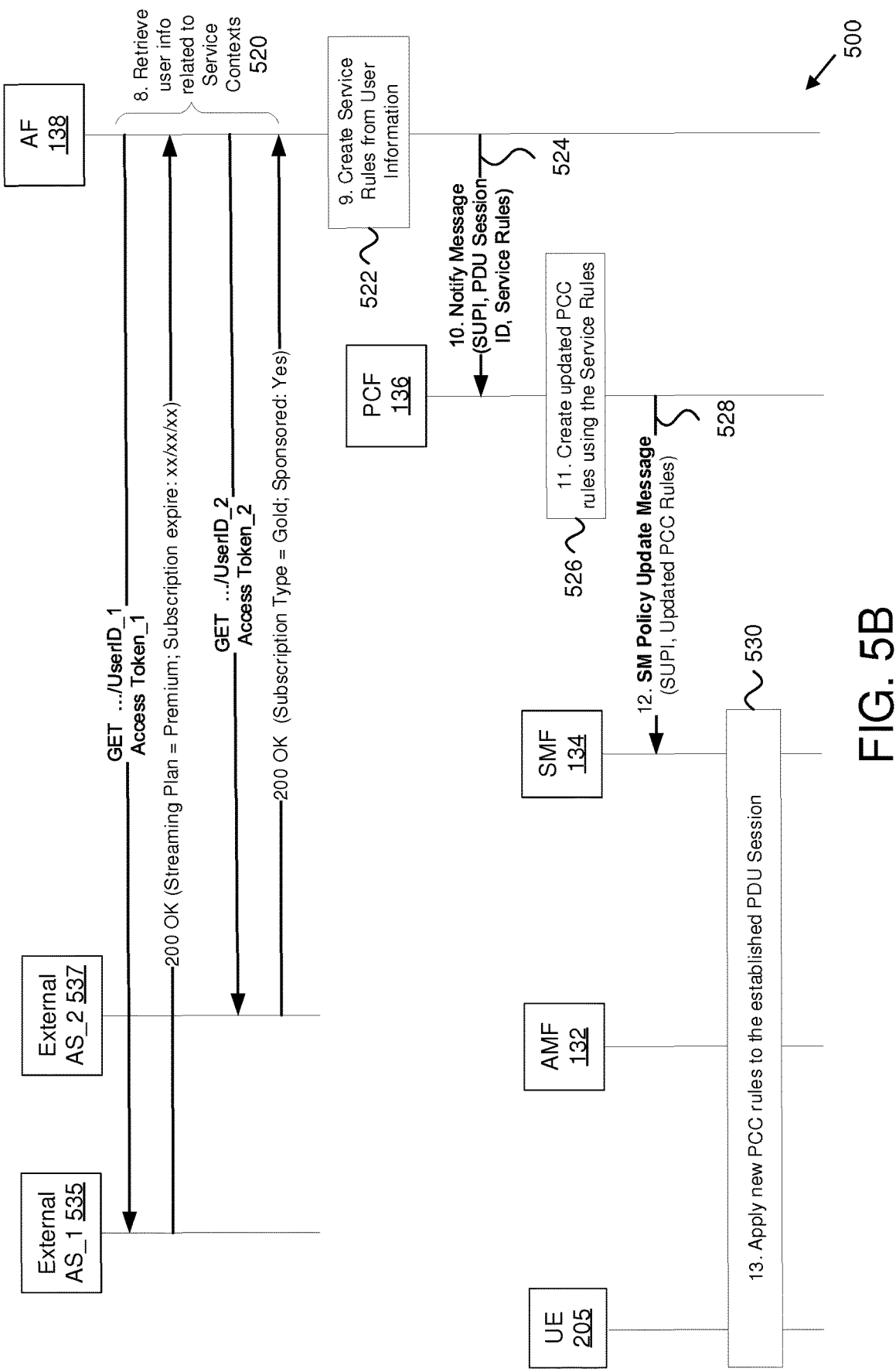
FIG. 5B is a continuation of the network procedure of FIG. 5A.

FIGS. 5A-5B depict a network procedure 500 for creating service rules for a data connection based on user information retrieved from an application server, according to embodiments of the disclosure. The network procedure 500 is an alternative to the network procedure 400, described above. The network procedure 500 involves the UE 205, the AMF 132, the SMF 134, the PCF 136, and the AF 138.

At FIG. 5A, the network procedure 500 begins as the UE 205 decides to establish a data connection (see block 502). The UE 205 sends a NAS message to the AMF 132 that includes a "PDU Session Establishment Request" (see messaging 504). The AMF 132, in turn, sends a session management ("SM") message to the SMF 134, such as a Nsmf_PDU_Session_CreateSMRequest message (see messaging 506). The messages 504 and 506 are substantially similar to the message 404 and 406 discussed above.

In response to receiving the SM message, the SMF 134 selects a UPF (or multiple UPFs) to support the user plane for the requested PDU session and allocates an IPv4 address and/or an IPv6 prefix for the PDU session (see block 508). Additionally, the SMF 134 requests policies for this PDU session from the PCF 136 (see messaging 510). Note that the policy request may include a Subscription element indicating whether the SMF 134 wants to receive notifications from the PCF 136 when the policies for the PDU session should be updated. Again, the PCF 136 requests service rules for the PDU session from the AF 138 (see messaging 512). Up to this point, the network procedures 400 and 500 are substantially the same.

However, in the network procedure 500, the AF 138 does not retrieve user context (also referred to as 'user information') from the external application servers before responding to PCF 136. Instead, the AF 138 responds immediately to PCF 136 with a message that does not contain any Service Rules (see messaging 514). Beneficially, doing so avoids delaying the PDU session establishment, while the AF 138 retrieves the user information from the external servers. Instead, the PDU session is established by using the pre-defined signaling and using any PCC rules that may be pre-configured in the PCF 136 and/or derived by PCF 136 by using other means (see block 516).

After responding to the PCF 136, the AF 138 identifies stored service contexts for the SUPI associated with the UE 205 (see block 518). Again, each Service Context includes information that can be used by AF 138 for accessing user information from a specific application server. Continuing at FIG. 5B, the AF 138 retrieves the user context from one or more external application servers (here, the first external AS 535 and the second external AS 537; see messaging 520). Having retrieved the user information, the AF 138 creates the Service Rules (see block 522). Retrieving the user information (context) and creating the Service Rules occur as described above with reference to steps 416 and 418 of FIG. 4B.

The AF 138 informs the PCF 136 of the user information-based Service Rules by sending a Notify message to PCF 136 with the created Service Rules (see messaging 524). Here, the Notify message includes the SUPI and PDU Session ID so that the Service Rules can be applied to the correct user and data connection. Recall that the AF 138 has already responded to the service rule request, so it sends the Service Rules using the Notify message. Note that the PCF 136 creates a subscription with AF 138 when it requests the Service Rules and requests that the AF 138 notify it when new Service Rules are available.

Here, the PCF 136 generates updated PCC rules for the SUPI (see block 526). Additionally, the PCF 136 sends the updated PCC rules to SMF 134 with another notification message (see messaging 528). Here, the PCF 136 includes the SUPI with the updated PCC rules to ensure that the PCC can be applied to the correct user and data connection. The SMF 134, AMF 132, and UE 205 then apply the new (updated) PCC rules to the established PDU session, thereby affecting the QoS, the charging, and/or the access leg (data path) of the data flows transferred via the PDU session based on the Service Rules (see block 530).

Figure 6A:
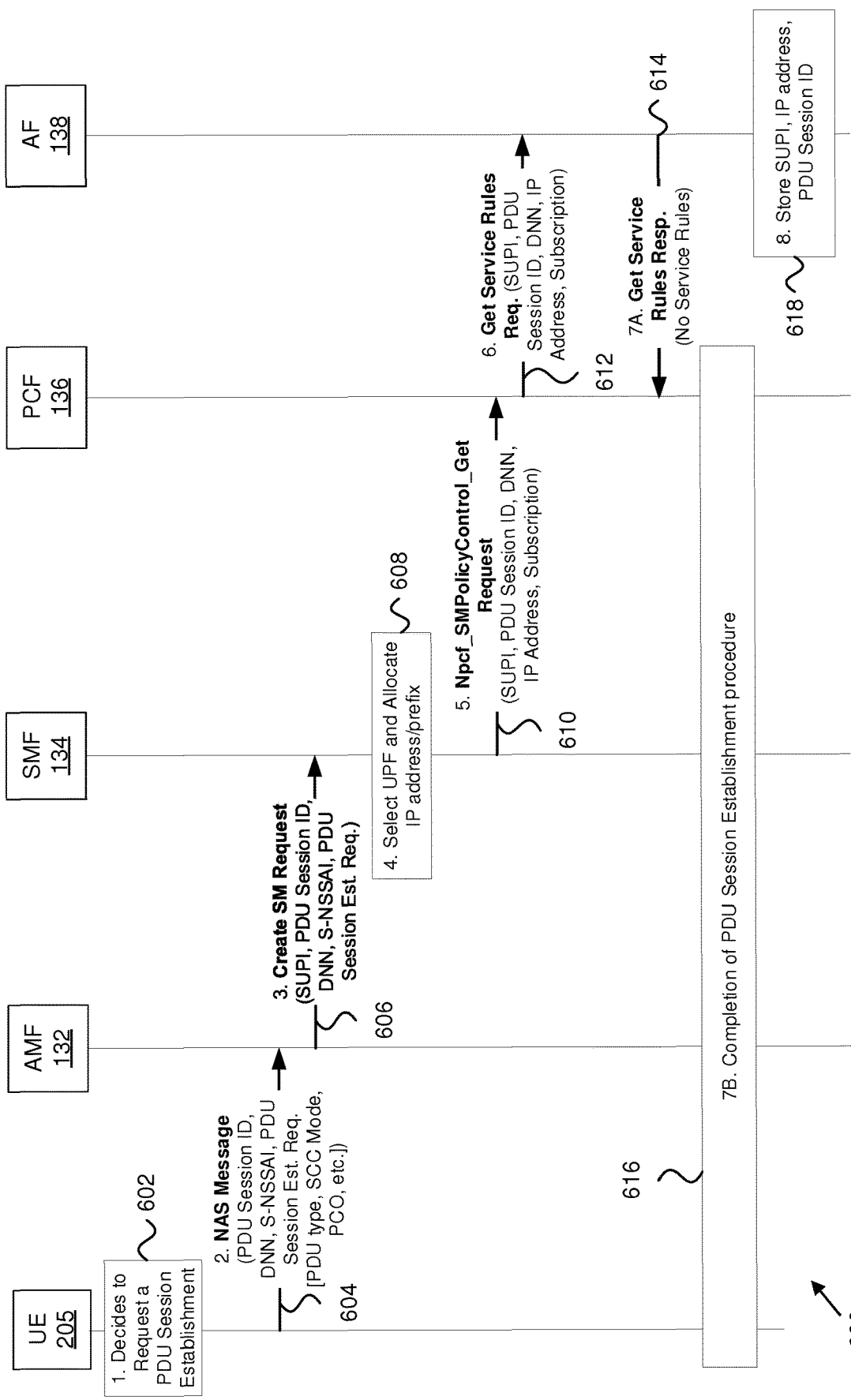
FIG. 6A is a block diagram illustrating one embodiment of a network procedure for creating a service context.
Figure 6B:
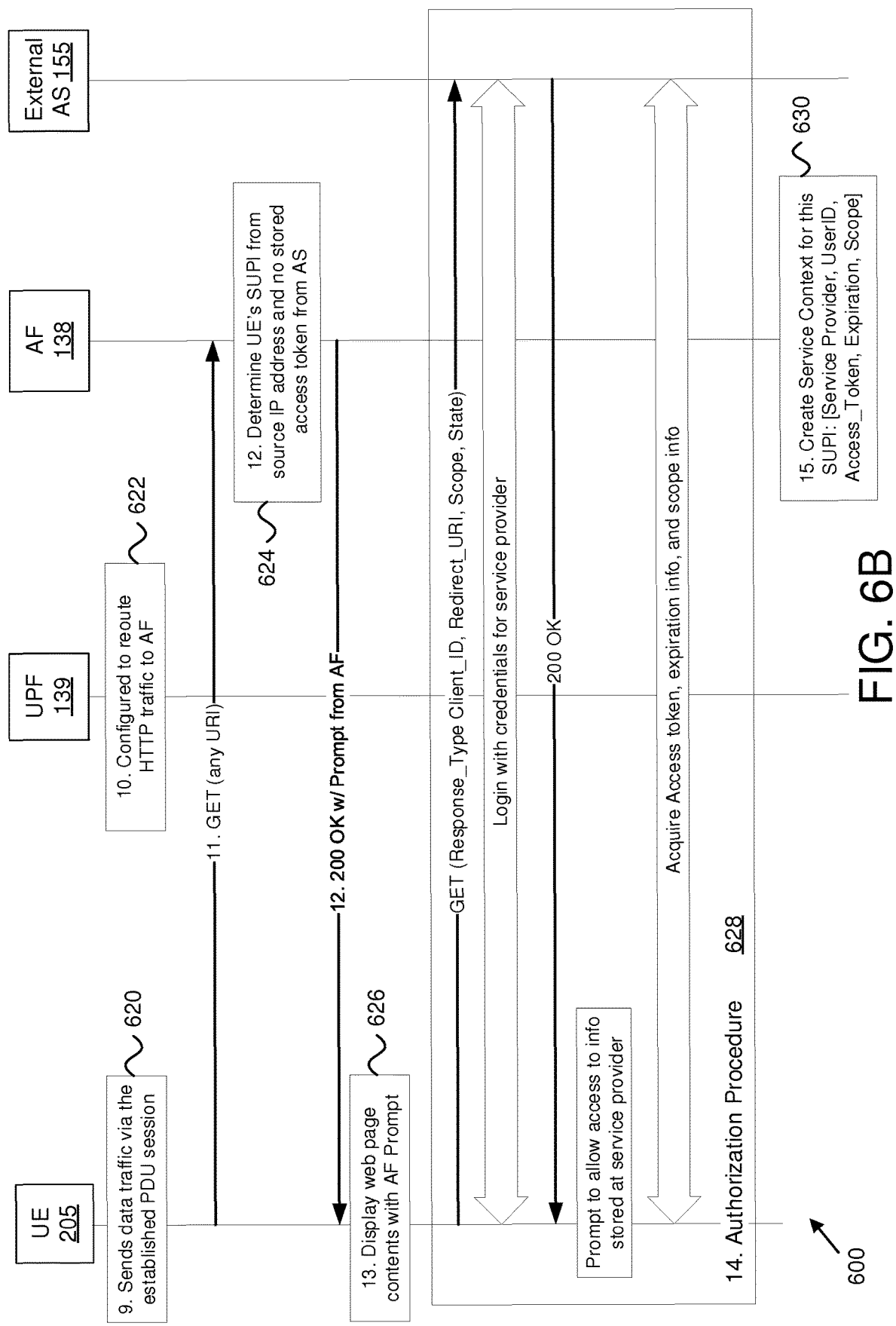
FIG. 6B is a continuation of the network procedure of FIG. 6A.

FIGS. 6A and 6B depict a network procedure 600 for creating service contexts, according to embodiments of the disclosure. The network procedure 600 involves the UE 205, the AMF 132, the SMF 134, the PCF 136, and the AF 138.

At FIG. 6A, the network procedure 600 begins as the UE 205 decides to establish a data connection (see block 602). The UE 205 sends a NAS message to the AMF 132 that includes a "PDU Session Establishment Request" (see messaging 604). The AMF 132, in turn, sends a session management ("SM") message to the SMF 134, such as a Nsmf_PDU_Session_CreateSMRequest message (see messaging 606). The messages 604 and 606 are substantially similar to the message 404 and 406, discussed above.

In response to receiving the SM message, the SMF 134 selects one or more UPFs to support the user plane for the requested PDU session and allocates an IPv4 address and/or an IPv6 prefix for the PDU session (see block 608). Again, the SMF 134 requests policies for this PDU session from the PCF 136 (see messaging 610) and the PCF 136 requests service rules for the PDU session from the AF 138 (see messaging 612). Up to this point, the network procedures 400, 500, and 600 are substantially the same.

However, in the network procedure 600, the AF 138 receives a request from PCF to provide Service Rules for a specific mobile user (identified by SUPI) for which it does not have any stored Service Contexts. Accordingly, the AF 138 responds to PCF 136 with a message that does not contain any Service Rules (see messaging 614). Note that the Subscription element may be used by PCF 136 to subscribe to notifications from AF 138, which can be used later if the AF 138 obtains Service Rules for this user and determines to provide them to PCF 136. The PDU session is established by using the predefined signaling and using any PCC rules that may be pre-configured in the PCF 136 and/or derived by PCF 136 by using other means (see block 616).

The AF 138 stores the SUPI and the IP address of the PDU session that was allocated by SMF 134 (see block 618). In certain embodiments, the AF 138 may also store the PDU session identity. Continuing at FIG. 6B, the UE 205 sends data traffic via the established PDU session (see block 620). Additionally, after the PDU session is established, all the HTTP traffic of the PDU session goes through the AF 138, which serves also as an HTTP proxy. Here, the UPF 139 is configured to route all HTTP traffic of the PDU session to AF 138 (see block 622). Alternatively, the AF 138 may be configured as an HTTP proxy in the UE 205.

Additionally, the AF 138 receives an HTTP request from the UE 205, for example when the mobile user attempts to access a HTTP service, such as www.yahoo.com. From the information previously stored in the AF 318 (e.g., the SUPI, IP address of the PDU Session, and optionally the PDU Session ID), the AF 318 associates this HTTP request with a SUPI (e.g., by using the source IP address in the HTTP request). The AF 138 further determines that it has no stored Service Contexts for this SUPI (see block 624). The AF 138 then decides to prompt the user to authorize the AF 138 to access the user's context in one or more service providers (e.g., a video streaming service provider, such as Netflix™). For this purpose, the AF intercepts the HTTP request sent by the UE and responds itself to this HTTP request. The response web page asks the user e.g., if he/she wants to improve his/her Netflix™ experience over the mobile network (see block 626). In this example, the response web page may ask the user to log in to his/her Netflix™ account.

If the user responds to the prompt to authorize access with Yes, then the procedure 600 begins an authorization procedure (see block 628), such as a conventional OAuth2 procedure. Here, the user logs in to Netflix™ (if not already logged in) and authorizes the mobile operator (e.g., the AF 138) to access his/her information (user context) at Netflix™, here stored at the external application server 155. At the end of the authentication procedure 628, the AF 138 obtains an access token ("Access_Token") from the Netflix™ application server 155 which can later be used to retrieve information about the user from Netflix™. Such information may include the user's subscription type, preferences, activities, and the like. Here, the 'Scope' parameter determines what type of information can be retrieved by the AF 138. Additionally, the 'Expiration' parameter indicates when the Access_Token expires and should be refreshed.

After completing the authentication procedure 628, the AF 138 creates and stores a Service Context for the mobile user (identified by SUPI) which contains the address of the external application server 155, the user's identity in the external application server 155, the Access_Token, etc. This Service Context can subsequently be used to acquire user information usable to determine Service Rules for the UE 205.

Although not depicted in the network procedure 600, in certain embodiments, the AF 138 may create one or more Service Rules after creating the Service Context and update the PCF 136 with the new Service Rules. The PCF 136, in turn, may generate updated PCC rules and the SMF 134, AMF 132, and UE 205 may apply these updates PCC rules to the established PDU session. As discussed above, the Service Rules may affect the QoS, the charging, and/or the access leg (data path) of the data flows transferred via the PDU session.

Figure 7:
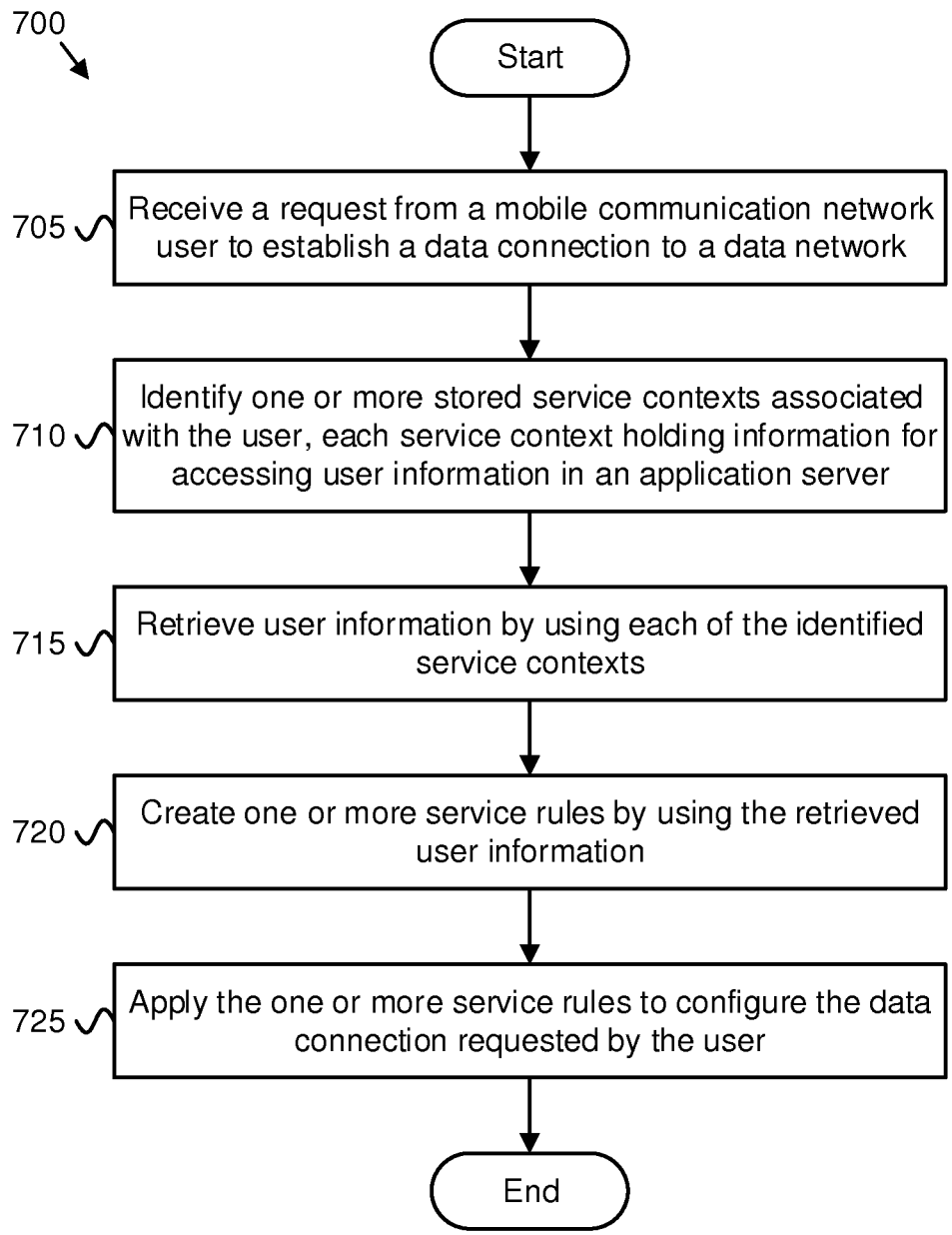
FIG. 7 is a schematic flow chart diagram illustrating one embodiment of a method for creating service rules based on user information retrieved from an application server.

FIG. 7 depicts a method 700 for creating service rules based on user information retrieved from an application server, according to embodiments of the disclosure. In some embodiments, the method 700 is performed by an apparatus, such as the application function 138 and/or the network function apparatus 300. In certain embodiments, the method 700 may be performed by a processor executing program code, for example, a microcontroller, a microprocessor, a CPU, a GPU, an auxiliary processing unit, a FPGA, or the like.

The method 700 begins and receives 705 a request to provide service rules for a mobile communication network user (also referred to as a "mobile user") in response to a request received by the mobile communication network to establish a data connection to a data network. In certain embodiments, receiving 705 the request to provide service rules for the user includes receiving a service rule request from a policy control function in the mobile communication network, the service rule request including a subscriber permanent identity ("SUPI") of the user and a data network name ("DNN").

The method 700 includes identifying 710 one or more service contexts associated with the user. Here, each service context contains information for accessing user information in an application server. In certain embodiments, a service context may be associated with both the mobile user and with a particular data network. In one embodiment, the application server is located in the requested data network. In some embodiments, each service context includes a network address of the application server, a user identifier in the application server associated with the user, and an access token corresponding to the user identifier for accessing user information stored on the application server.

In certain embodiments, identifying 710 one or more service contexts associated with the user includes creating a service context. Here, the service context may be created by requesting the user to authorize the access to information associated with the user that is stored in an application server. In some embodiments, requesting the user to authorize access to information associated with the user includes intercepting user traffic data traffic of the user and responding to the intercepted traffic with the request to access the information associated with the user that is stored in an application server.

The method 700 includes retrieving 715 user information by using each of the identified service contexts and creating 720 one or more service rules by using the retrieved user information. In certain embodiments, the retrieved user information indicates one or more of: subscription type, user preferences, usage activity for a service provided by the application server, and social network activity of the user. The method 700 further includes applying 725 the one or more service rules to configure the data connection requested by the user. In one embodiment, the data connection is established after creating 720 the service rules. In another embodiment, the data connection is established prior to creating 720 the service rules and applying 725 the one or more service rules includes modifying the established data connection once the service rules are created.

In some embodiments, the application server is operated by a third-party service provider and wherein the retrieved user information indicates a subscription type that the user has with the third-party service provider. In certain embodiments, each of the one or more service rules is associated with a service provided by the application server (e.g., with a Spotify™ streaming service provided by the Spotify™ application server). In one embodiment, the service rule associated with a particular application server indicates a quality of service level to be applied to traffic associated with the service. In such an embodiment, the service rule associated with a particular service provided by the application server indicates a quality of service level to be applied to traffic associated with this service. In certain embodiments, the service rule associated with a particular service provided by the application server indicates a charging rate to be applied to traffic associated with this service. When the subscription type that the mobile user has with the third-party service provider (or user preferences, usage activity for a service provided by the application server, or social network activity) meets a predetermined requirement, the quality of service may be an improved quality of service and/or the charging rate may be a reduced charging rate. The method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a transceiver configured to communicate with one or more network functions in a mobile communication network and with one or more application servers external to the mobile communication network; and
   a processor coupled to the transceiver, wherein the processor is configured to:
   receive, from a policy control function, a request to provide service rules for a user requesting to establish a data connection to a data network via the mobile communication network;
   identify one or more service contexts associated with the user, each service context holding information for accessing user information in a respective application server external to the mobile communication network;
   retrieve user information from the respective application server external to the mobile communication network using each of the identified one or more service contexts; and
   create one or more service rules by using the retrieved user information, wherein the mobile communication network applies the one or more service rules to configure the data connection requested by the user.

2. The apparatus of claim 1, wherein receiving the request to provide service rules for the user comprises receiving a service rule request, the service rule request including at least one of a subscriber permanent identity ("SUPI") of the user and a data network name ("DNN").

3. The apparatus of claim 1, wherein each service context includes a network address of the respective application server, a user identifier in the respective application server associated with the user, and an access token corresponding to the user identifier for accessing user information stored in the respective application server.

4. The apparatus of claim 1, wherein the processor further creates a respective service context by requesting the user to authorize the access to information associated with the user that is stored in the respective application server.

5. The apparatus of claim 4, wherein requesting the user to authorize the access to information associated with the user comprises intercepting data traffic of the user and responding to the intercepted traffic with a request to authorize the access to information associated with the user that is stored in the respective application server.

6. The apparatus of claim 1, wherein the respective application server external to the mobile communication network is operated by a third-party service provider and wherein the retrieved user information indicates a subscription type that the user has with the third-party service provider.

7. The apparatus of claim 1, wherein each of the one or more service rules is associated with an application server providing one or more services, wherein the service rule associated with a particular application server indicates a quality of service level to be applied to traffic associated with the one or more services of the particular application server.

8. The apparatus of claim 7, wherein the service rule associated with the particular application server indicates an improved quality of service level in response to a subscription type that the user has with a service provider associated with the particular application server meeting a predetermined requirement.

9. The apparatus of claim 1, wherein each of the one or more service rules is associated with an application server providing one or more services, wherein the service rule associated with a particular application server indicates a charging rate to be applied to traffic associated with the one or more services of the respective application server.

10. The apparatus of claim 9, wherein the service rule associated with the particular application server indicates a reduced charging rate in response to a subscription type that the user has with a service provider associated with the particular application server meeting a predetermined requirement.

11. The apparatus of claim 1, wherein the retrieved user information indicates one or more of: user preferences, usage activity for a service provided by the respective application server, and social network activity of the user.

12. A method comprising:
   receiving, from a policy control function in a mobile communication network, a request to provide service rules for a user requesting to establish a data connection to a data network via the mobile communication network;
   identifying one or more service contexts associated with the user, each service context holding information for accessing user information in a respective application server external to the mobile communication network;
   retrieving user information from the respective application server external to the mobile communication network using each of the identified service contexts;
   creating one or more service rules by using the retrieved user information; and
   applying the one or more service rules to configure the data connection requested by the user.

13. The method of claim 12, wherein receiving the request to provide service rules for a user comprises receiving a service rule request, the service rule request including at least one of a subscriber permanent identity ("SUPI") of the user and a data network name ("DNN").

14. The method of claim 12, wherein each service context includes a network address of the respective application server, a user identifier in the respective application server associated with the user, and an access token corresponding to the user identifier for accessing user information stored in the application server.

15. The method of claim 12, further comprising creating a respective service context by requesting the user to authorize the access to information associated with the user that is stored in the respective application server.

16. The method of claim 15, wherein requesting the user to authorize access to information associated with the user comprises intercepting user traffic data traffic of the user and responding to the intercepted traffic with the request to access the information associated with the user that is stored in the respective application server.

17. The method of claim 12, wherein the respective application server external to the mobile communication network is operated by a third-party service provider and wherein the retrieved user information indicates a subscription type that the user has with the third-party service provider.

18. The method of claim 12, wherein each of the one or more service rules is associated with an application server providing one or more services, wherein the service rule associated with a particular application server indicates a quality of service level to be applied to traffic associated with the one or more services of the particular application server.

19. The method of claim 18, wherein the service rule associated with the particular application server indicates an improved quality of service level in response to a subscription type that the user has with a service provider associated with the particular application server meeting a predetermined requirement.

20. The method of claim 12, wherein each of the one or more service rules is associated with an application server providing one or more services, wherein the service rule associated with a particular application server indicates a charging rate to be applied to traffic associated with the one or more services of the respective application server.

* * * * *